（12）United States Patent
Ou

(10) Patent No.: US 8,948,023 B2
(45) Date of Patent: Feb. 3, 2015

(54) ENHANCING MTRACE TO DETECT FAILURE IN MULTICAST DIVERSE PATHS

(75) Inventor: Heidi H. Ou, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 771 days.

(21) Appl. No.: 12/873,179

(22) Filed: Aug. 31, 2010

(65) Prior Publication Data

US 2012/0051231 A1 Mar. 1, 2012

(51) Int. Cl.
*H04L 12/26* (2006.01)
*H04L 12/18* (2006.01)
*H04L 12/761* (2013.01)

(52) U.S. Cl.
CPC ............... *H04L 43/10* (2013.01); *H04L 12/18* (2013.01); *H04L 45/16* (2013.01)
USPC ........................................ 370/248

(58) Field of Classification Search
None
See application file for complete search history.

(56) References Cited

U.S. PATENT DOCUMENTS

| | | | | |
|---|---|---|---|---|
| 5,926,463 | A * | 7/1999 | Ahearn et al. ................. | 370/254 |
| 7,684,316 | B2 | 3/2010 | Filsfils et al. | |
| 7,986,689 | B2 * | 7/2011 | Shen et al. .................... | 370/389 |
| 8,126,470 | B2 * | 2/2012 | Zheng ............................ | 455/446 |
| 2002/0110119 | A1 * | 8/2002 | Fredette et al. ............... | 370/389 |
| 2005/0213510 | A1 * | 9/2005 | Wakumoto et al. ........... | 370/252 |
| 2006/0203819 | A1 * | 9/2006 | Farinacci et al. ............. | 370/390 |
| 2007/0030846 | A1 * | 2/2007 | Szczesniak et al. .......... | 370/384 |
| 2009/0110394 | A1 * | 4/2009 | Xu et al. ........................ | 398/45 |
| 2009/0135728 | A1 * | 5/2009 | Shen et al. .................... | 370/250 |
| 2010/0238819 | A1 * | 9/2010 | Uehori et al. ................. | 370/252 |
| 2011/0317696 | A1 * | 12/2011 | Aldrin et al. ................... | 370/390 |
| 2012/0120954 | A1 * | 5/2012 | Mentze et al. ................ | 370/390 |

OTHER PUBLICATIONS

Cai, Y., et al., "PIM Multi-Topology ID (MT-ID) Join-Attribute", Cisco Systems, Inc.,p. 2.*
Asada, H., et al., "Mtrace Version 2: Traceroute Facility for IP Multicast", draft-ietf-mbone-mtrace-v2-07.txt, Jul. 2010 (39 pgs).
Bradner, S., "Key words for use in RFCs to Indicate Requirement Levels", BCP 14, RFC 2119, Mar. 1997 (3 pgs).
Cai, Y., et al., "PIM Multi-Topology ID (MT—ID) Join-Attribute", draft-ietf-pim-mtid-04.txt, Mar. 2010 (11 pgs).
Cain, B., Deering, S., Kouvelas, I., Fenner, B., and A. Thyagarajan, "Internet Group Management Protocol, Version 3", RFC 3376, Oct. 2002 (53 pgs).
Fenner, B., et al., "Protocol Independent Multicast—Sparse Mode (PIM—SM): Protocol Specification (Revised)", RFC 4601, Aug. 2006 (150 pgs).
Karan, A., et al., "Multicast Only Fast Re-Route", draft-karan-mofrr-00.txt, Mar. 2009 (13 pgs).
Vida, R., et al., "Multicast Listener Discovery Version 2 (MLDv2) for IPv6", RFC 3810, Jun. 2004 (62 pgs).

* cited by examiner

*Primary Examiner* — Huy D Vu
*Assistant Examiner* — Bao G Nguyen
(74) *Attorney, Agent, or Firm* — Novak Druce Connolly Bove + Quigg LLP

(57) ABSTRACT

In one embodiment, a network device may receive an mtrace query, where the mtrace query identifies two or more multicast routing paths. The network device may generate two or more mtrace requests using at least a portion of information obtained from the mtrace query such that each of the two or more mtrace requests identifies a different one of the two or more multicast routing paths. The network device may send each of the two or more mtrace requests via a different one of the two or more multicast routing paths. The network device may then receive at least one response including information pertaining to the two or more multicast routing paths.

26 Claims, 13 Drawing Sheets

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type 302   |     Length     304     |     Value .... 306  |
+-+-+-+-+-+-+-+-+-+-+-+-+-+-+-+-+-+-+-+-+-+-+-+-+-+-+-+-+-+-+-+-+
```

FIG. 3

```
 0 1 2 3 4 5 6 7 8 9 0 1 2 3 4 5 6 7 8 9 0 1 2 3 4 5 6 7 8 9 0 1
                                        +-+-+-+-+-+-+-+-+-+-+-+
                                        |   402     # hops    |
+-+-+-+-+-+-+-+-+-+-+-+-+-+-+-+-+-+-+-+-+-+-+-+-+-+-+-+-+-+-+-+-+
|                                                              |
|                  Multicast Address       404                 |
|                                                              |
+-+-+-+-+-+-+-+-+-+-+-+-+-+-+-+-+-+-+-+-+-+-+-+-+-+-+-+-+-+-+-+-+
|                                                              |
|                   Source Address      406                    |
|                                                              |
+-+-+-+-+-+-+-+-+-+-+-+-+-+-+-+-+-+-+-+-+-+-+-+-+-+-+-+-+-+-+-+-+
|                                                              |
|                 Destination Address    408                   |
|                                                              |
+-+-+-+-+-+-+-+-+-+-+-+-+-+-+-+-+-+-+-+-+-+-+-+-+-+-+-+-+-+-+-+-+
|       410       Query ID |    412      Client Port #         |
+-+-+-+-+-+-+-+-+-+-+-+-+-+-+-+-+-+-+-+-+-+-+-+-+-+-+-+-+-+-+-+-+
```

FIG. 4

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+
    |          Type           |            Value ....             |
    +-+-+-+-+-+-+-+-+-+-+-+-+-+-+-+-+-+-+-+-+-+-+-+-+-+-+-+-+-+-+-+
```

| Code  | Type |
|-------|------|
| 0x01  | # Mtrace2 Standard Response Blocks Returned |
| *0x02 | Redundant Path Request |
| *0x03 | Redundant Flow Request |
| *0x04 | Topology ID Response |
| *0x05 | Redundant Path Information Response |
| *0x06 | Redundant Flow Information Response |
| *0x07 | Merge Point of Redundant Paths Response |
| *0x08 | Merge Point Of Redundant Flows Response |

FIG. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type = 2   602    |     Alternate Query ID    604      |
+-+-+-+-+-+-+-+-+-+-+-+-+-+-+-+-+-+-+-+-+-+-+-+-+-+-+-+-+-+-+-+-+
|S|R|   TTL   610    |               .
+-+-+-+-+-+-+-+-+-+-+-+-+-+-+-+-+-+
606 608
```

FIG. 6A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type = 3   612    |        Alternate   614             |
+-+-+-+-+-+-+-+-+-+-+-+-+-+-+-+-+-+-+-+-+-+-+-+-+-+-+-+-+-+-+-+-+
|       Source   614    |        Alternate   616             |
+-+-+-+-+-+-+-+-+-+-+-+-+-+-+-+-+-+-+-+-+-+-+-+-+-+-+-+-+-+-+-+-+
|       Group   616  |S|R|    TTL   . 622                    |
+-+-+-+-+-+-+-+-+-+-+-+-+-+-+-+-+-+-+-+-+-+-+-+-+-+-+-+-+-+-+-+-+
                      618 620
```

FIG. 6B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type = 4   632  |M|    Topology ID    636              |
+-+-+-+-+-+-+-+-+-+-+-+-+-+-+-+-+-+-+-+-+-+-+-+-+-+-+-+-+-+-+-+-+
                    634
```

FIG. 6C

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type = 5   642 |   Alternate Query ID    644           |
+-+-+-+-+-+-+-+-+-+-+-+-+-+-+-+-+-+-+-+-+-+-+-+-+-+-+-+-+-+-+-+-+
|       Standard Response Data Blocks     646     .          |
+-+-+-+-+-+-+-+-+-+-+-+-+-+-+-+-+-+-+-+-+-+-+-+-+-+-+-+-+-+-+-+-+
```

Figure 6: Redundant Path Information Response

FIG. 6D

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type = 6   652   |   Standard Response Data Blocks  654    |
+-+-+-+-+-+-+-+-+-+-+-+-+-+-+-+-+-+-+-+-+-+-+-+-+-+-+-+-+-+-+-+-+
           With Topology Information   656
+-+-+-+-+-+-+-+-+-+-+-+-+-+-+-+-+-+-+-+-+-+-+-+-+-+-+-+-+-+-+-+-+
```

FIG. 6E

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type = 7   662  |      Alternate Query ID       664        |
+-+-+-+-+-+-+-+-+-+-+-+-+-+-+-+-+-+-+-+-+-+-+-+-+-+-+-+-+-+-+-+-+
|         Standard Response Data Block        668               |
+-+-+-+-+-+-+-+-+-+-+-+-+-+-+-+-+-+-+-+-+-+-+-+-+-+-+-+-+-+-+-+-+
```

FIG. 6F

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type = 8   672   |          Alternate  674                 |
+-+-+-+-+-+-+-+-+-+-+-+-+-+-+-+-+-+-+-+-+-+-+-+-+-+-+-+-+-+-+-+-+
|         Source          |          Alternate  676             |
+-+-+-+-+-+-+-+-+-+-+-+-+-+-+-+-+-+-+-+-+-+-+-+-+-+-+-+-+-+-+-+-+
|         Group           |M| 678   Topology ID      680        |
+-+-+-+-+-+-+-+-+-+-+-+-+-+-+-+-+-+-+-+-+-+-+-+-+-+-+-+-+-+-+-+-+
|           Standard Response Data Block        682             |
+-+-+-+-+-+-+-+-+-+-+-+-+-+-+-+-+-+-+-+-+-+-+-+-+-+-+-+-+-+-+-+-+
```

FIG. 6G

Network device receives two or more mtrace requests, each of the two or more mtrace requests corresponding to a different one of two or more multicast routing paths and including topology information identifying one or more other network devices in the corresponding one of the two or more multicast routing paths
912

Network device generates an mtrace response including the topology information from each of the two or more mtrace requests
914

Network device transmits the mtrace response to a destination identifier identified in the two or more mtrace requests
916

FIG. 9B

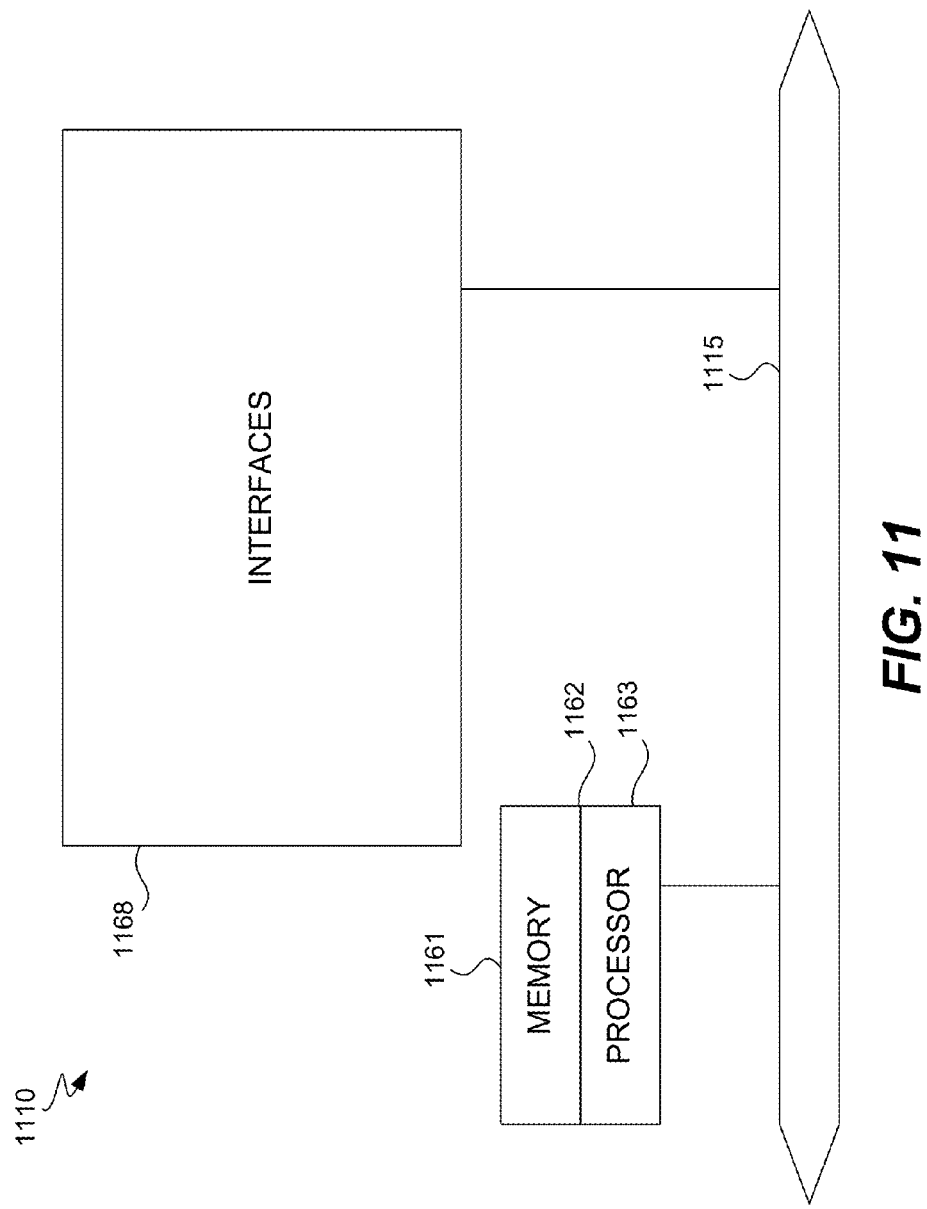

ENHANCING MTRACE TO DETECT FAILURE IN MULTICAST DIVERSE PATHS

BACKGROUND

1. Technical Field

The present disclosure relates generally to message formats, methods and apparatus for implementing mtrace for diverse paths.

2. Description of the Related Art

Internet Draft, "Mtrace Version 2: Traceroute Facility for IP Multicast," Jul. 12, 2010, Asaeda et al, available at "http://tools.ietf.org/html/draft-ietf-mboned-mtrace-v2-07," describes version 2 of the Internet Protocol (IP) multicast traceroute facility, which may be referred to as mtrace. Mtrace allows the tracing of a single IP multicast routing path.

A client typically invokes mtrace by sending an mtrace query message (i.e., query message). A router or proxy receiving the query message creates and sends an mtrace request message (i.e., request message) corresponding to the query. When a first-hop router, proxy (a single hop from a source specified in the request), or core router receives a query or request message, the router or proxy generates and sends an mtrace response message (i.e., response message) to the client. The client typically waits for a response message and displays the results. When the client does not receive a response message, the client can resend a query message.

BRIEF DESCRIPTION OF THE DRAWINGS

FIG. 3 is a diagram illustrating an example mtrace packet format.

FIG. 4 is a diagram illustrating an example mtrace query header that may be implemented in accordance with various embodiments.

FIG. 5 is a diagram illustrating example types of augmented response blocks that may be implemented in accordance with various embodiments of the invention.

FIG. 6A is a diagram illustrating an example Redundant Path Request augmented response block.

FIG. 6B is a diagram illustrating an example Redundant Flow Request augmented response block.

FIG. 6C is a diagram illustrating an example Topology ID Response augmented response block.

FIG. 6D is a diagram illustrating an example Redundant Path Information Response augmented response block.

FIG. 6E is a diagram illustrating an example Redundant Flow Information Response augmented response block.

FIG. 6F is a diagram illustrating an example Merge Point of Redundant Paths Response augmented response block.

FIG. 6G is a diagram illustrating an example Merge Point of Redundant Flows Response augmented response block.

FIG. 9B is a process flow diagram illustrating an example method of generating a response message from two or more request messages by a FHR in accordance with various embodiments.

FIG. 11 is a diagrammatic representation of an example router in which various embodiments may be implemented.

DESCRIPTION OF EXAMPLE EMBODIMENTS

Figure 1:
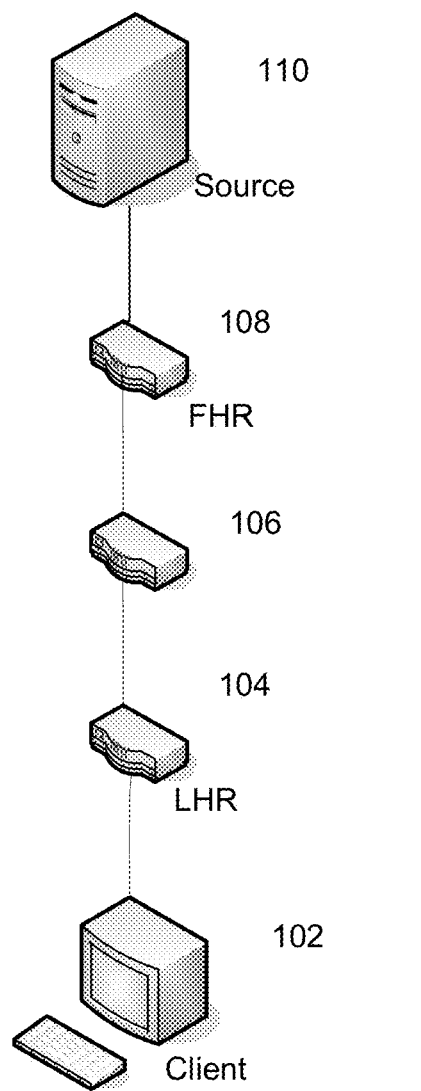
FIG. 1 is a diagram illustrating the use of mtrace for a single path.

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order to simplify the description.

Overview

In one embodiment, a network device may receive an mtrace query, where the mtrace query identifies two or more multicast routing paths. The network device may generate two or more mtrace requests using at least a portion of information obtained from the mtrace query such that each of the two or more mtrace requests identifies a different one of the two or more multicast routing paths. The network device may send each of the two or more mtrace requests via a different one of the two or more multicast routing paths. The network device may then receive at least one response including information pertaining to the two or more multicast routing paths.

Specific Example Embodiments

Today, multicast resilience is important for the zero loss, or near zero loss, delivery of multicast video and data. There are two main solutions to improve resilience. The first solution is described in Internet Draft, "Multicast only Fast Re-Route," "Mar. 2, 2009, Karan et al, available at "http://tools.ietf.org/html/draft-karan-mofrr-00," describes Multicast only Fast Re-Route (MoFRR). This first solution is also described in U.S. Pat. No. 7,684,316, entitled, "Multicast fast reroute for network topologies," issued on Mar. 23, 2010, by Filsfils et al. The second solution is described in Internet Draft, "PIM Multi-Topology ID (MT-ID) Join-Attribute," Mar. 29, 2010, Cai et al, available at "http://tools.ietf.org/html/draft-ietf-pim-mtid-04," describes a new type of PIM Join Attribute that may be used to encode the identity of the topology Protocol Independent Multicast (PIM) uses for Reverse Path Forwarding (RPF). This second solution will be referred to herein as Live-Live.

With MoFRR, a downstream router may determine two Reverse Path Forwarding (RPF) interfaces for a single packet flow, which may be identified by a source address (S) and a multicast group address (G), which is typically represented (S,G). It may then send one PIM join out of each RPF interface. In doing so, the downstream router may receive two streams of the same packet flow. More particularly, the downstream router may receive a first stream transmitted on a primary path via a primary RPF interface, and a second stream transmitted on a secondary path via a secondary RPF interface. The downstream router may then merge the two streams by discarding packets received from the secondary RPF interface. When there is a failure detected on the primary path, the router may switch to forward packets received from the secondary RPF interface instead. The identification of a path as primary or secondary may be determined by a router or multicast application. Therefore, either of the two multicast routing paths may be identified as the primary path.

In addition, with Live-Live, there are two packet flows distinguishable by two different sets of (S,G) network layer addresses, i.e., (S1, G1) and (S2, G2). The two packet flows may be generated by the source, or by an ingress router. Similarly, the two packet flows may be merged by an end host or an egress router. The network may build two non-overlapping paths, using for example Multi-Topology Internet Gateway Protocol (MT-IGP). Each of the two flows may be forwarded separately along its path within a topology. As a result, a single network failure happening to one of the paths will not affect the other path, thus guaranteeing a zero loss delivery.

Mtrace cannot be easily used in networks with MoFRR or Live-Live deployed because these networks usually have two multicast forwarding trees established for the same transport flow. As a result, it is difficult to trouble shoot different paths. In accordance with various embodiments, mtrace may be enhanced to trace two or more RPF paths simultaneously.

Moreover, in MoFRR/Live-Live networks, there is the possibility that the two paths might merge onto a single router unexpectedly during routing when a routing change occurs. This is not a catastrophic situation because as long as this router is forwarding, resilience is still maintained. However, it would be desirable to detect when such a condition has occurred. Mtrace currently cannot be easily used to detect the merging of different paths onto a single router because an mtrace response message is usually sent immediately by the first hop router. Thus, if the first hop router were to receive two or more request messages via different paths, only information associated with the first path via which the first request message is received would be provided in the response message. In accordance with various embodiments, mtrace may be enhanced to allow a response message to be sent in a delayed and/or asynchronous fashion.

FIG. 1 is a diagram illustrating the use of mtrace for a single path, (S,G). As shown in this example, a client (i.e., querier) 102 coupled to a last-hop router (LHR) 104 may send a query message identifying network layer addresses (S,G) and a destination address (D). The LHR 104 may generate and forward a request message corresponding to the query message to upstream routers. The request message may be intercepted and augmented by one or more intermediate routers 106 until it is received by a first-hop router (FHR) 108 coupled to source 110. The FHR 108 generates and sends a response message to the client 102 identified by the destination address.

Figure 2:
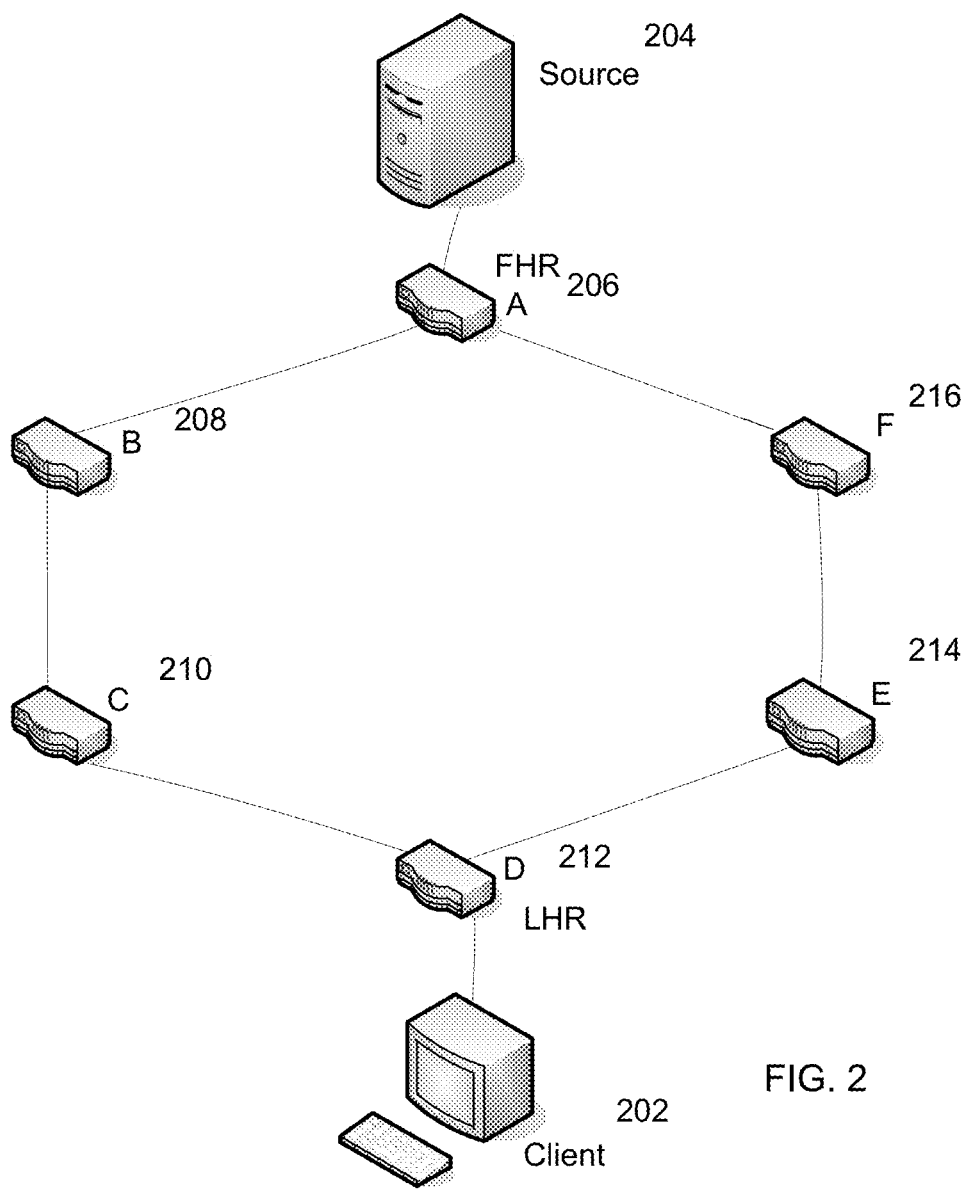
FIG. 2 is a diagram illustrating an example network in which MoFF or Live-live may be implemented.

FIG. 2 is a diagram illustrating an example network in which MoFRR or Live-live may be implemented. In MoFRR or Live-live networks, two or more different paths may exist between a client 202 and source 204. The routers A-F may be numbered 206-216, respectively, as shown. More particularly, router D 212 may operate as a LHR, while router A 206, may operate as a FHR. In this example, the two different paths between the client 202 and the source 204 may be identified as D-C-B-A and D-E-F-A. It is optimum if two paths do not merge at any of the routers, with the exception of the LHR 212 or the FHR 206. In other words, it is preferable if two paths do not merge at routers B 208, C 210, E 214, or F 216.

In accordance with various embodiments, the client 202 may generate and send an extended query message that identifies two or more paths to be traced. Upon receiving the extended query message sent by the client 202, the LHR 212 may generate two or more request messages from the query message. In addition, the LHR 212 may provide topology information in each of the request messages. The LHR 212 may forward each of the two or more request messages to the source. More particularly, the LHR 212 may forward each of the request messages via a different one of the two or more paths to the source.

Upon receiving a request message, an intermediate router may store the request message (or portion thereof), enabling the intermediate router to determine that it is a merge point of two (or more) different paths upon receiving a subsequent request message for a different path. Upon ascertaining that it is a merge point, the intermediate router may provide information identifying it as a merge point for a particular path in the request message (e.g., by providing it's IP address and/or merge point indicator). In addition, the intermediate router may provide topology information in the request message. The intermediate router may then forward the request message to the source.

When the FHR 206 receives the request messages for the two or more different paths, it may generate one or more response messages and forward the response messages to the source. More particularly, in order to eliminate unnecessary traffic in the network, the FHR 206 may generate a single response message from the two or more request messages. Information pertaining to the topology of each of the two or more paths (or selected path(s)) may be provided in the response message(s) sent by the FHR 206. In addition, information pertaining to merge point(s) of each of the two or more paths (or selected path(s)) may be provided in the response message(s). The FHR 206 may send the response message to the client 202 at the destination address D.

In accordance with various embodiments, a client device may be configured to send a query message in accordance with the disclosed embodiments. In addition, network devices such as multicast routers may also be configured to generate and send two or more request messages from a query message that has been received and/or generate and send a response message from two or more request messages, as will be described in further detail below. The client device and the network devices (e.g., multicast routers) may be configured with hardware and/or software to implement the disclosed embodiments. More particularly, a multicast router may be configured to operate as a last-hop router (LHR), first-hop router (FHR), and/or core router in accordance with disclosed embodiments.

The disclosed embodiments provide extended formats for a query message, request message, and response message, which may be generated and transmitted in accordance with various embodiments to trace two or more paths simultaneously. These packet formats will be described in further detail below with reference to FIGS. 3-5 and 6A-6G.

FIG. 3 is a diagram illustrating an example mtrace packet format that may be implemented in accordance with various embodiments. As shown in FIG. 3, the mtrace packet may include a type field 302, a length field 304, and a value field 306. In one embodiment, the type field 302 is 8 bits, the length 304 is 16 bits, and the value 306 may be of variable length. The type field may indicate whether the mtrace message is a query, a request, a response, a standard response block, an augmented response block, or an extended query. For example, the codes 1, 2, 3, 4, 5, and 6 may be used to indicate whether the mtrace message is a query, a request, a response, a standard response block, an augmented response block, or an extended query, respectively. In accordance with one embodiment, the multicast router that sends either a request (e.g., code 2) or a response (e.g., code 3) may append a standard response block (e.g., code 4), as well as one or more augmented response blocks (e.g., code 5). Example augmented response blocks will be described in further detail below with reference to FIGS. 5 and 6A-G. An example extended query (e.g., code 6) will be described in further detail below with reference to FIG. 7.

FIG. 4 is a diagram illustrating an example mtrace header that may be implemented in accordance with various embodiments. Each mtrace message (e.g., query, request or response message) may include the mtrace query header. As shown in FIG. 4, the header may specify a number of hops (# hops) 402 that the client wants to trace. In addition, the header may include fields for a multicast group address (G) 404, a source address 406 of the multicast source for the path being traced, and a destination address 408 at which the trace starts.

The header may also include fields for a Query Identifier (ID) 410 and a Client Port Number 412. The Query ID 410 may be used as a unique identifier for a query message (and corresponding request messages) so that duplicate or delayed responses may be detected. In other words, the Query ID 410 may be used to trace a selected path. In addition, the Client Port Number 412 may identify the port number (associated with the destination address) to which a response message is to be sent.

In order to implement extended query, extended request, and extended response messages, additional fields may be used to transmit additional information in these messages. In accordance with various embodiments, these additional fields may be provided in one or more "augmented response blocks." Example augmented response blocks will be described in further detail below with reference to FIG. 5 and FIGS. 6A-G.

FIG. 5 is a diagram illustrating example types of augmented response blocks that may be implemented in accordance with various embodiments of the invention. As shown in FIG. 5, code 1 may be used to specify a number of standard response blocks returned. Codes 2-8 are shown in this example as identifying various augmented response blocks that may be appended to a query, request, or response message in accordance with various embodiments. More particularly, augmented response blocks may include a Redundant Path Request, a Redundant Flow Request, a Topology Identifier (ID) Response, Redundant Path Information Response, Redundant Flow Information Response, Merge Point of Redundant Paths Response, and/or Merge Point of Redundant Flows Response. These augmented response blocks may be used separately or in combination with one another. Each augmented response block may include a type and a value, as will be described in further detail below with reference to FIGS. 6A-G.

FIG. 6A is a diagram illustrating an example Redundant Path Request augmented response block. This augmented response block may be included in a query or request message. As shown in this example, a Type field 602 may include a code (e.g., 2) identifying the augmented response block as a Redundant Path Request. The Redundant Path Request may also include an Alternate Query Identifier (ID) field 604, an S field 606, a Reserved® field 608, and a Time-To-Live (TTL) field 610.

The Alternate Query ID field 604 may include a Query ID used to trace an alternate path. The Query ID in the Alternate Query ID field 604 should be different from the Query ID in the query header, enabling two different paths being traced to be identified by the two different Query IDs (e.g., in a MoFRR network).

The S field 606 may be used to indicate whether the Query ID in the header is used to trace a primary path or a secondary path. The R field 608 may be reset to 0.

The TTL field 610 may specify a time-to-live of the query (and corresponding request(s)). More particularly, the TTL may dictate how long the mtrace query (and corresponding request(s)) are valid. In one embodiment, the TTL is specified in seconds. The TTL may be application dependent.

FIG. 6B is a diagram illustrating an example Redundant Flow Request augmented response block. This augmented response block may be included in a query or request message. As shown in this example, a Type field 612 may indicate a code (e.g., 3) identifying the augmented response block as a Redundant Flow Request. The Redundant Flow Request may also include an Alternate Source field 614, an Alternate Group field 616, an S field 618, a Reserved® field 620, and a Time-To-Live (TTL) field 622. Thus, an alternate source address and an alternate group address may be used to identify an alternate path (corresponding to an alternate flow) to be traced (e.g., in a Live-Live network).

The Alternate Source field 614 may include a source address of the alternate flow. If the source address in the Alternate Source field 614 is the same as the source address in the Source Address field in the common Query header, the group addresses should be different.

The Alternate Group field 616 may include a group address of the alternate flow. If the group address in the Alternate Group field 616 is the same as the multicast group address in the multicast Group address field in the common Query header, the source addresses should be different.

The S field 618 may be used to indicate whether the Query ID in the header is used to trace a primary path or a secondary path. The R field 620 may be reset to 0.

The TTL field 622 may be indicate a time-to-live of the query (and corresponding request(s)). In one embodiment, the TTL is specified in seconds. The TTL may be application dependent.

FIG. 6C is a diagram illustrating an example Topology ID Response augmented response block. In accordance with various embodiments, the Topology ID Response block may describe a topology ID corresponding to RPF information included in a corresponding (e.g., preceding) Standard Response Block of a response message. In other words, for each LHR or intermediate router, a corresponding Standard Response Block and Topology ID Response block may be appended to the request (or response) being transmitted. More particularly, a router may provide its IP address in an incoming interface address field and an outgoing interface address field of the Standard Response block. A description of information that may be provided in the Topology ID Response block will be described in further detail below.

As shown in this example, a Type field 632 may indicate a code (e.g., 4) identifying the augmented response block as a Topology ID Response Block.

An M field 634 may indicate a type of Topology ID field that follows. For example, if M is 1, the Topology ID may be defined for PIM, while if M is 0, the Topology ID may come from a corresponding IGP. When multi-topology is not used, M may be reset to 0 and a Topology ID may be set to 0.

A Topology ID 636 field may identify at least a portion of the ID (e.g., lower 15 bits) of the topology from which the RPF information is obtained.

The Topology ID Response augmented response block may be appended to a request message (e.g., following a preceding Standard Response Block) by a LHR or an intermediate router. More particularly, one or more Topology ID Response augmented response blocks may be appended (e.g., each following a corresponding Standard Response Block) as the request message is routed via a particular path. When the request message is received by the FHR, the Standard Response Block(s) may identify the LHR and each of the intermediate routers within the path.

FIG. 6D is a diagram illustrating an example Redundant Path Information Response augmented response block. This augmented response block may be included in an mtrace Response Message sent from the FHR to the originator of the mtrace Request Message (or originator of the Query Message) (e.g., in a MoFRR network). In accordance with various embodiments, the mtrace Response Message may include two or more series of Standard Response Blocks. The first series of Standard Response Blocks may correspond to a first Query/Request (e.g., and corresponding Query ID) that is used to trace the primary path. The second series of Standard Response Blocks may be embedded in an augmented response block, as shown in FIG. 6D, to describe information corresponding to a secondary path.

As shown in this example, a Type field 642 may indicate a code (e.g., 5) identifying the augmented response block as a Redundant Path Information Response Block. An Alternate Query ID field 644 may include an Alternate Query ID associated with an alternate path being traced. One or more Standard Response Data Blocks 646 may be appended while tracing using the Alternate Query ID on an alternate (e.g., secondary path) to carry information such as tracing information provided in a standard mtrace response block.

FIG. 6E is a diagram illustrating an example Redundant Flow Information Response augmented response block. This augmented response block may be included in an mtrace Response Message sent from the FHR to the originator of the Request Message(s) (or corresponding Query Message) (e.g., in a Live-Live network). More particularly, the response message may include a first portion that includes tracing information obtained using a first (e.g., primary) flow (S1, G1) and a second portion, which includes tracing information obtained using an alternate (e.g., secondary) flow, (S2, G2). The tracing information may include topology information. More particularly, topology information associated with each flow may be specified by a corresponding Redundant Flow Information Response block, as described with reference to FIG. 6E.

As shown in FIG. 6E, a Type field 652 may indicate a code (e.g., 6) identifying the augmented response block as a Redundant Flow Information Response Block. As shown in this example, a Standard Response Data Block 654 might be followed by topology information 656, which may be provided in a Topology ID Response block, as described above with reference to FIG. C. Therefore, a Redundant Flow Information Response block might include another augmented response block.

FIG. 6F is a diagram illustrating an example Merge Point of Redundant Paths Response augmented response block. This augmented response block may be provided in a Request Message or Response Message to identify a merge point of redundant paths. As shown in FIG. 6F, a Type field 662 may indicate a code (e.g., 7) identifying the augmented response block as a Merge Point of Redundant Paths Response Block. An Alternate Query ID field 664 may include a Query ID associated with an alternate (e.g., secondary) path (e.g., in a MoFF network). A merge point may be identified by specifying an identifier (e.g., IP address) of the merge point (e.g., router) at which two redundant paths merge. The merge point may be identified in fields such as an Incoming Interface Address field and an Outgoing Interface Address field of a Standard Response Data Block 668 (e.g., within the Merge Point of Redundant Paths Response augmented response block). Thus, the presence of the Merge Point of Redundant Paths Response augmented response block may function as a merge point indicator to indicate the presence of a merge point.

FIG. 6G is a diagram illustrating an example Merge Point of Redundant Flows Response augmented response block. This augmented response block may be provided in a Request Message or Response Message to identify a merge point of redundant flows (e.g., in a Live-Live network). As shown in FIG. 6G, a Type field 672 may indicate a code (e.g., 8) identifying the augmented response block as a Merge Point of Redundant Flows Response Block.

An Alternate Source field 674 may include a source address of the alternate flow. If the source address in the Alternate Source field 674 is the same as the source address in the Source Address field in the common Query header, the group addresses should be different.

An Alternate Group field 676 may identify an alternate multicast group address of an alternate (e.g., secondary) flow. If the group address in the Alternate Group field 676 is the same as the multicast group address in the multicast Group address field in the common Query header, the source addresses should be different.

An M field 678 may indicate a type of Topology ID field that follows. For example, if M is 1, the Topology ID may be defined for PIM, while if M is 0, the Topology ID may come from a corresponding IGP. When multi-topology is not used, M may be reset to 0 and a Topology ID may be set to 0.

A Topology ID 680 field may identify at least a portion of the ID (e.g., lower 15 bits) of the topology from which the RPF information is obtained.

A merge point may be identified by specifying an identifier (e.g., IP address) of the merge point (e.g., router) at which two redundant paths and corresponding flows merge. The merge point may be identified in fields such as an Incoming Interface Address field and an Outgoing Interface Address field of a Standard Response Data Block 682 (e.g., within the Merge Point of Redundant Flows Response augmented response block). Thus, the presence of the Merge Point of Redundant Flows Response augmented response block may serve as a merge point indicator to indicate the presence of a merge point.

Figure 7:
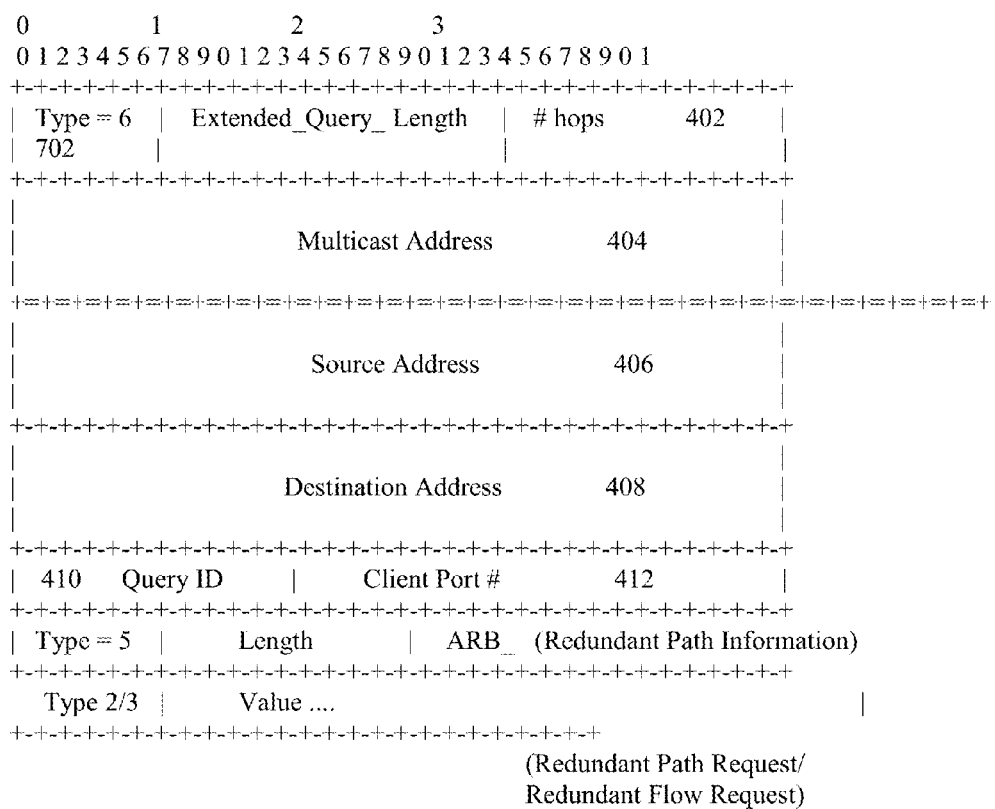
FIG. 7 is a diagram illustrating an example Extended Query Message that may be transmitted by a client in accordance with various embodiments.

FIG. 7 is a diagram illustrating an example Extended Query Message that may be transmitted by a client in accordance with various embodiments. As shown in FIG. 7, a query header of an extended query may include a Type field 702 indicating that the query is an extended query. For example, the Type field 702 may include a code (e.g., 6) identifying the message type as an extended query.

The header of the query may further specify a number of hops (# hops) 402 that the client wants to trace. In addition, the query header may includes fields for a multicast group address (G) 404, a source address 406 of the multicast source for the path being traced, and a destination address 408 at which the trace starts.

The query header may also include fields for a Query Identifier (ID) 410 and a Client Port Number 412. The Query ID 410 may be used as a unique identifier for a request message so that duplicate or delayed responses may be detected. In other words, the Query ID 410 may be used to trace a selected path. In addition, the Client Port Number 412 may identify the port number (associated with the destination address) to which a response message is to be sent.

In order to implement an extended query, an augmented response block may be appended, as shown. More particularly, a Redundant Path Request block or a Redundant Flow Request block, as described above, may be appended. More particularly, an alternate Query ID may be provided in a Redundant Path Request block in order to initiate a trace of an alternate path (e.g., in a MoFF network), while an Alternate Source address and Alternate Group address may be provided in a Redundant Flow Request block (e.g., in a Live-Live network) in order to initiate a trace of an alternate path associated with an alternate flow.

Processes that may be performed by a LHR, intermediate router, and FHR will be described in further detail below with reference to FIGS. 8A-10B. In order to simplify the description, an extended query will be referred to as a query. Similarly, an extended request will be referred to as a request, while an extended response will be referred to as a response.

Figure 8A:
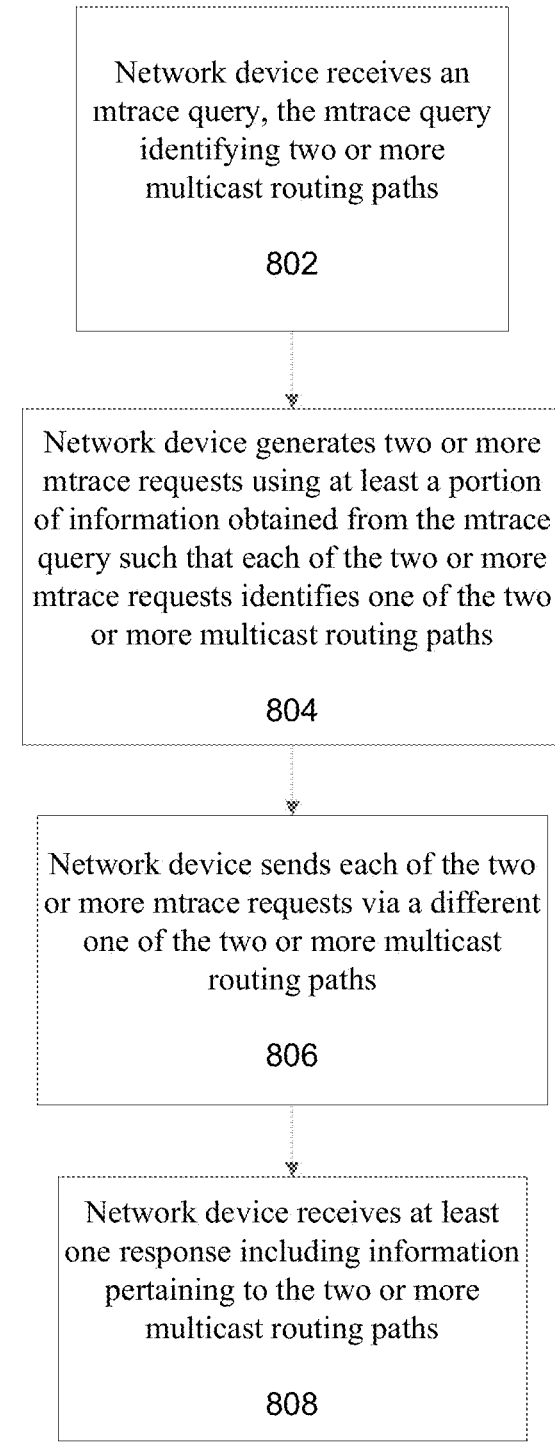
FIG. 8A is a process flow diagram illustrating an example method of generating two or more request messages from a query message that may be implemented by a LHR in accordance with various embodiments.

FIG. 8A is a process flow diagram illustrating an example method of generating two or more request messages from a query message that may be implemented by a network device such as a LHR in accordance with various embodiments. A network device may receive an mtrace query from a client at 802, where the mtrace query identifies two or more multicast routing paths. Each of the multicast routing paths may include at least one different intermediate router from the other multicast routing paths. The query may conform with a format such as that described above with reference to FIG. 7. More particularly, the query may include a time-to-live (TTL) value. In addition, the query may include two or more path identifiers identifying the two or more multicast routing paths, where each of the two or more path identifiers identifies a different one of the two or more multicast routing paths.

The two or more path identifiers may be implemented in various ways. As shown and described above, a query may include at least one source identifier, at least one multicast group identifier, at least one query identifier, and a destination identifier. In one embodiment, the path identifiers may be implemented via query identifiers (e.g., in a MoFRR network). More particularly, the query may include two or more query identifiers identifying the two or more multicast routing paths, where each of the two or more query identifiers identifies a different one of the two or more multicast routing paths. In another embodiment, the path identifiers may be implemented by source-group pairs (e.g., in a Live-Live network). More particularly, the query may include two or more source-group pairs, where each of the two or more source-group pairs includes a different pair of source and multicast group identifiers. Each of the two or more source-group pairs may identify a different one of the two or more multicast routing paths. The source-group pairs may be implemented in various ways. There are three possibilities. First, each source-group pair may identify a different source and a different multicast group identifier. Second, each of the source-group pairs may identify the same source identifier and a different group identifier. Third, each of the source-group pairs may identify the same multicast group address and a different source identifier.

The network device may generate two or more mtrace requests at 804 using at least a portion of information obtained from the mtrace query such that each of the two or more mtrace requests identifies a different one of the two or more multicast routing paths. More particularly, each of the requests may include a header such as that described above with reference to FIG. 4. Thus, each of the two or more mtrace requests may include a different one of the two or more path identifiers provided in the request (e.g., in a header). In one embodiment, a header of each of the two or more mtrace requests may include a different one of two or more query identifiers (e.g., in a MoFRR network). In another embodiment, a header of each of the two or more mtrace requests may include a different one of two or more source-group pairs (e.g., in a Live-Live network). More particularly, the source-group pairs may include different source identifiers and/or different multicast group addresses.

In accordance with various embodiments, each of the two or more mtrace requests may identify a different one of the two or more multicast routing paths in a header, and further identify one or more alternate multicast routing paths (e.g., in a Redundant Path Request block or Redundant Flow Request block). For example, the header may include the Query ID, Source Identifier, and Multicast Group Address for the pertinent path. In addition, the alternate redundant path (e.g., identified via an alternate S-G pair or Query ID) may be identified in the request (e.g., in a Redundant Flow Request block or Redundant Path Request block). Each of the two or more mtrace requests may also include a TTL value originally provided in the query (e.g., by providing the TTL in a Redundant Flow Request block or Redundant Path Request block).

In addition, each of the two or more mtrace requests may further comprise topology information in a topology portion of the corresponding request. More particularly, each of the two or more mtrace requests may further comprise topology information including an identifier of the LHR and/or Topology ID. In accordance with various embodiments, the LHR may append a Standard Response Block including an IP address of the LHR (e.g., in an incoming interface address field and outgoing interface address field) to each request. In addition, the LHR may append a Topology ID Response augmented response block to each request (e.g., immediately following a Standard Response Block) in order to provide a Topology ID in the corresponding request.

The network device may send each of the two or more mtrace requests via a different one of the two or more multicast routing paths at 806. Each intermediate router intercepting a request may process the request as described in further detail below with reference to FIGS. 9A and 10A. A FHR receiving the two or more requests may generate and send at least one response (e.g., a single response) including information pertaining to the two or more multicast routing paths, as will be described in further detail below with reference to FIGS. 9B and 10B.

The network device may then receive the at least one response (e.g., single response) including the information pertaining to the two or more multicast routing paths at 808. The information in the response may pertain to a topology of one or more of the two or more multicast routing paths. More particularly, the information may pertain to a topology of each or the two or more multicast routing paths. In addition, the information in the response may indicate whether a merge point exists in one or more of the two or more multicast routing paths. Specifically, the response may identify each merge point in each of the two or more multicast routing paths. As set forth above, topology information may be provided in one or more Topology ID Response blocks (and one or more immediately preceding Standard Response Blocks). Merge point information may be provided in a Merge Point of Redundant Paths Response block (e.g., in a MoFRR network) or a Merge Point of Redundant Flows Response block (e.g., in a Live-Live network).

Figure 8B:
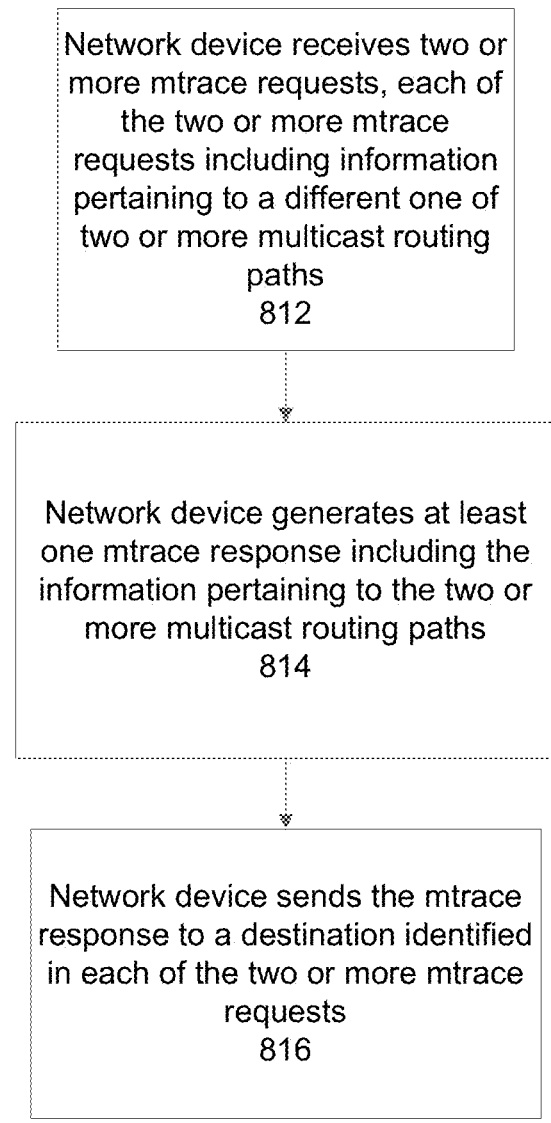
FIG. 8B is a process flow diagram illustrating an example method of generating a response message from two or more request messages that may be implemented by a FHR in accordance with various embodiments.

FIG. 8B is a process flow diagram illustrating an example method of generating a response message from two or more request messages that may be implemented by a FHR in accordance with various embodiments. A network device such as a FHR may receive two or more mtrace requests, each of the two or more mtrace requests including information pertaining to a different one of two or more multicast routing paths at 812. For instance, the information may include topology and/or merge point information. The network device may generate at least one mtrace response (e.g., a single response) including the information pertaining to the two or more multicast routing paths at 814. The network device may then send the mtrace response to a destination identifier in each of the two or more mtrace requests at 816.

Topology information and Merge Point information, as well as additional trace information typically provided in an mtrace response, may be provided in a request message by an intermediate router and transmitted in a response message by a FHR. In order to simplify the description, the processing of topology information will be described separately from the processing of Merge Point information. More particularly, the processing of topology information by an intermediate router and FHR will be described in further detail below with reference to FIGS. 9A and 9B, respectively. The processing of Merge Point information by an intermediate router and FHR will be described in further detail below with reference to FIGS. 10A and 10B, respectively. However, it is important to note that both the topology information and merge point information may both be processed by an intermediate router and FHR, as well as transmitted in the same request message or response message.

Figure 9A:
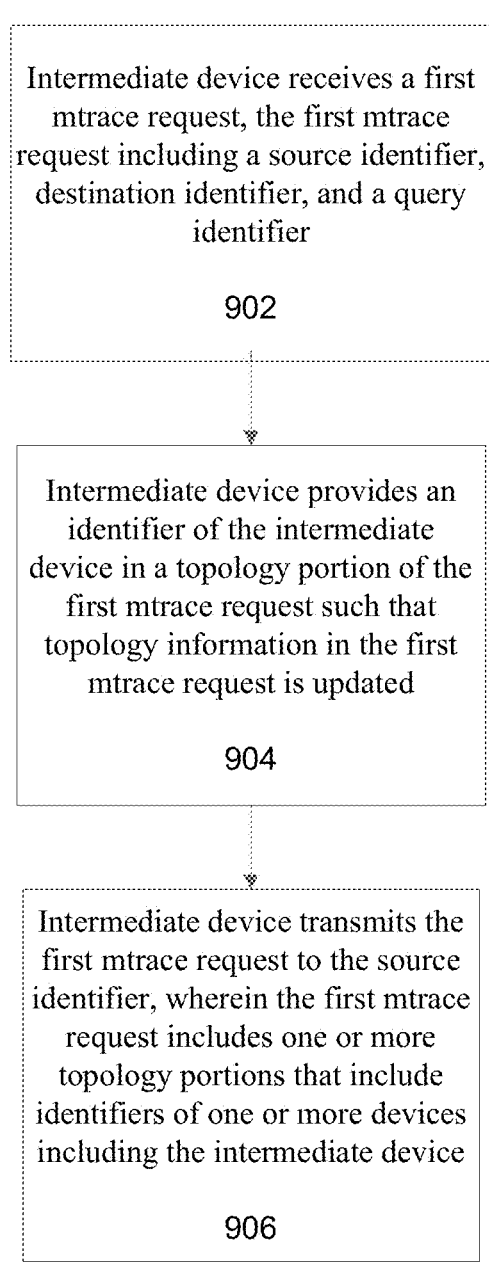
FIG. 9A is a process flow diagram illustrating an example method of processing a request message by an intermediate router in accordance with various embodiments.

FIG. 9A is a process flow diagram illustrating an example method of processing a request message by an intermediate device such as an intermediate router in accordance with various embodiments. The intermediate device may receive a first mtrace request at 902, where the first mtrace request includes a source identifier, destination identifier, and a query identifier (e.g., in a header of the request message). When the intermediate device receives the request, the request may already include Topology information (e.g., provided by a LHR and/or one or more other intermediate devices) and/or Merge Point information (e.g., provided by one or more other intermediate devices), as set forth above. The Topology information may be transmitted in the request via one or more Topology ID Response blocks (e.g., and corresponding Standard Response Blocks), while Merge Point information may be transmitted in one or more Merge Point of Redundant Paths Response blocks (e.g., in a MoFRR network) or one or more Merge Point of Redundant Flows Response blocks (e.g., in a Live-Live network).

The intermediate device may provide an identifier (e.g., IP address) of the intermediate device in a topology portion of the first mtrace request at 904 such that topology information in the first mtrace request is updated. For example, the topology portion may be implemented, in part, by an incoming interface address field and outgoing interface address field of a Standard Response Block. In addition, the topology portion may further include a Topology ID augmented response block. Therefore, the intermediate device may provide an IP address of one of its interfaces in the incoming interface address field and outgoing interface address field of a Standard Response Block, and provide a Topology ID in a Topology ID Response Block (e.g., immediately following the pertinent Standard Response Block). Accordingly, the intermediate device may append an additional topology portion (e.g., Standard Response Block and subsequent Topology ID Response Block), and provide an IP address of one of its interfaces in the topology portion (e.g., in the Standard Response Block), as well as provide a Topology ID in the topology portion (e.g., in the Topology ID augmented response block).

If the intermediate determines that it is a Merge Point, as will be described in further detail below with reference to FIG. 10A, the intermediate device may append a merge portion to the request and provide an IP address of one if its interfaces in the merge portion. For example, the merge portion may be implemented by a Merge Point of Redundant Paths Response block (e.g., in a MoFRR network) or a Merge Point of Redundant Flows Response block (e.g., in a Live-Live network).

In accordance with various embodiments, the request may include a TTL. The intermediate device may store at least a portion of the request, and save this portion until a corresponding TTL expires. More particularly, the saved portion may include information pertaining to the path, such as a Source Identifier, Destination Identifier, Group Identifier, and Query Identifier. The saved portion of the request may be used later by the intermediate device to determine whether it is a Merge Point. Upon determining that the intermediate device is a Merge Point when a subsequent request is received, as will be described in further detail below with reference to FIG. 10A, the intermediate device may append a merge portion and provide an identifier of one of its interfaces in the merge portion of a subsequent request.

The intermediate device may then transmit the first mtrace request to the source identifier at 906, wherein the first mtrace request includes one or more topology portions that include identifiers (e.g., IP addresses) of one or more devices including the intermediate device. For example, the devices may include the LHR and one or more intermediate devices. In addition, each of the topology portions may include a Topology Identifier (ID) associated with a corresponding one of the identifiers. Each of the topology portions may include a Standard Response Block, where each of the identifiers is provided in a different Standard Response Block. Each of the topology portions may further include a Topology Identifier (ID) augmented response block (e.g., immediately following a corresponding Standard Response Block) such that the Topology ID associated with each of the identifiers is provided in a different Topology ID augmented response block. The processing of the request that includes topology information by a FHR will be described in further detail below with reference to FIG. 9B.

FIG. 9B is a process flow diagram illustrating an example method of generating a response message from two or more request messages by a network device such as a FHR in accordance with various embodiments. As shown in FIG. 9B, a network device such as a FHR may receive two or more mtrace requests at 912, where each of the two or more mtrace requests corresponds to a different one of two or more multicast routing paths and includes topology information identifying one or more other network devices in the corresponding one of the two or more multicast routing paths. In addition, each of the two or more mtrace requests may include a Topology ID corresponding to each of the one or more other network devices in the corresponding one of the two or more multicast routing paths.

The network device may generate an mtrace response including the topology information from each of the two or more mtrace requests at 914. The mtrace response may include a first topology portion corresponding to a first one of the two or more mtrace requests and a second topology portion corresponding to a second one of the two or more mtrace requests, wherein the first topology portion includes a network identifier of one or more network devices in a first one of the two or more multicast routing paths, and wherein the second topology portion includes a network identifier of one or more network devices in a second one of the two or more multicast routing paths. In addition, the first topology portion may further include a Topology ID corresponding to each of the one or more other network devices in the first one of the two or more multicast routing paths, and the second topology portion may further include a Topology ID corresponding to each of the one or more other network devices in the second one of the two or more multicast routing paths. These distinct topology portions may be implemented in a manner similar to the topology portion of an mtrace request, as described above with reference to FIG. 9A. In one embodiment, a Redundant Path Information Response may be appended to the response to provide information pertaining to an alternate path (e.g., in a MoFF network). In another embodiment, a Redundant Flow Information Response may be appended to the response to provide information pertaining to an alternate path (e.g., in a Live-Live network).

As described above, the response may include information pertaining to each of the two or more multicast routing paths. The network device may then transmit the mtrace response to a destination identifier identified in the two or more mtrace requests at 916.

Figure 10A:
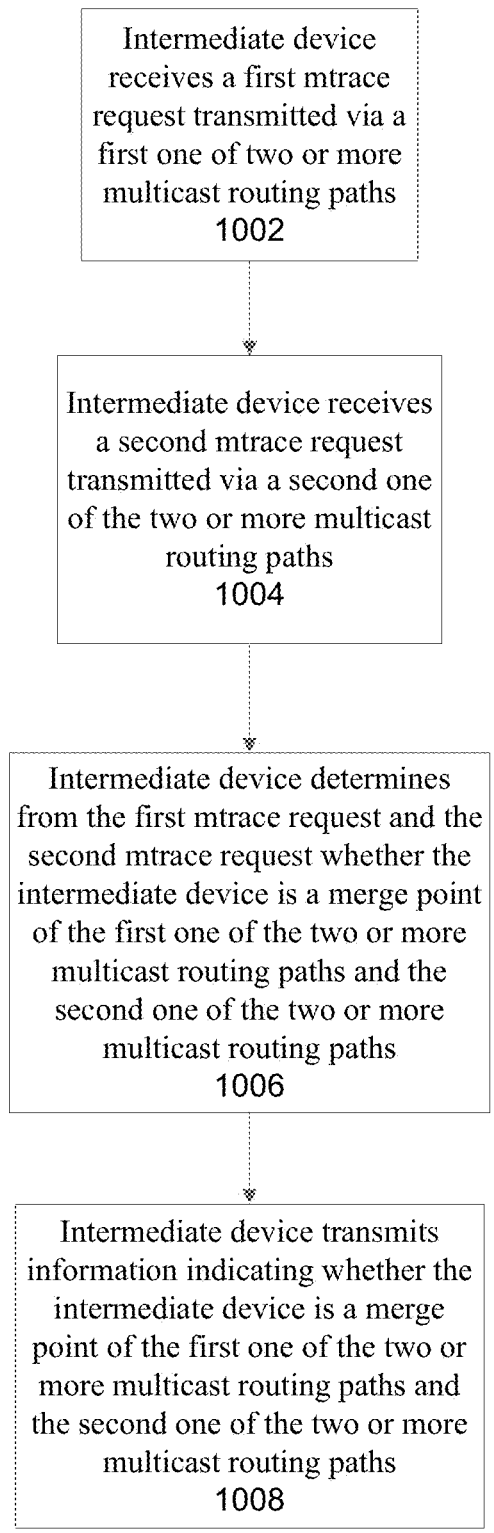
FIG. 10A is a process flow diagram illustrating another example method of processing a request message by an intermediate router in accordance with various embodiments.

FIG. 10A is a process flow diagram illustrating another example method of processing a request message by an intermediate device such as an intermediate router in accordance with various embodiments. An intermediate device such as a router may receive a first mtrace request transmitted via a first one of two or more multicast routing paths at 1002. The intermediate device may store at least a portion of the first mtrace request (e.g., the source identifier, group identifier, destination identifier and query identifier) until a TTL identified in the first mtrace request expires. In addition, the intermediate device may receive a second mtrace request transmitted via a second one of the two or more multicast routing paths at 1004. The intermediate device may similarly store at least a portion of the second mtrace request (e.g., the source identifier, group identifier, destination identifier and query identifier) until a TTL identified in the second mtrace request expires.

The intermediate device may determine from the first mtrace request and the second mtrace request whether the intermediate device is a merge point of the first one of the two or more multicast routing paths and the second one of the two or more multicast routing paths at 1006. In one embodiment, the intermediate device may compare the Query ID of the first mtrace request (e.g., provided in a header of the first mtrace request and subsequently stored) with a Query ID identified in a Redundant Path Request block of the second mtrace request (e.g., in a MoFRR network). If the two Query IDs are equal, the intermediate device is a merge point of both the primary path and an alternate path. In another embodiment, the intermediate device may compare a Source Identifier and Group multicast address of the first mtrace request (e.g., provided in a header of the first mtrace request and subsequently stored) with a Source Identifier and Group multicast address identified in a Redundant Flow Request block of the second mtrace request (e.g., in a Live-Live network). If both source-group pairs are identical, the intermediate device is a merge point of both the primary path and an alternate path.

The intermediate device may then transmit information indicating whether the intermediate device is a merge point of the first one of the two or more multicast routing paths and the second one of the two or more multicast routing paths at 1008. For example, the information indicating whether the intermediate device is a merge point of the first multicast routing path and second multicast routing path may be transmitted in the second mtrace request. More particularly, if the intermediate device determines that it is a merge point of two different multicast routing paths, merge information may be provided in the second mtrace request. The merge information may identify the intermediate device as a merge point of a path corresponding to the first mtrace request and a second path corresponding to the second mtrace request. In accordance with one embodiment, the intermediate device may append a merge portion (e.g., augmented response block) to the request and provide an IP address of one if its interfaces in one or more fields of a Standard Request Block (e.g., immediately preceding or within the merge portion), as described above. For example, the merge portion may be implemented by a Merge Point of Redundant Paths Response block (e.g., in a MoFRR network) or a Merge Point of Redundant Flows Response block (e.g., in a Live-Live network). The intermediate device may then transmit the second mtrace request including the merge information identifying the intermediate device as the merge point of the first path corresponding to the first mtrace request and the second path corresponding to the second mtrace request.

If the intermediate device determines that it is not a merge point of two different paths, the intermediate device may forward the second mtrace request without appending or inserting information regarding merge points. Therefore, the lack of merge information (e.g., Merge Point of Redundant Paths Response block or Merge Point of Redundant Flows Response block) in a request (or response) may indicate that no merge points exist in the network.

In addition, when an mtrace request is still alive (i.e., while the TTL of the request has not expired), the intermediate router may restart the request (e.g., re-send the request) when there is a change (e.g., RPF change). Without this capability, an mtrace query or request is typically issued by an operator (e.g., at the destination).

Figure 10B:
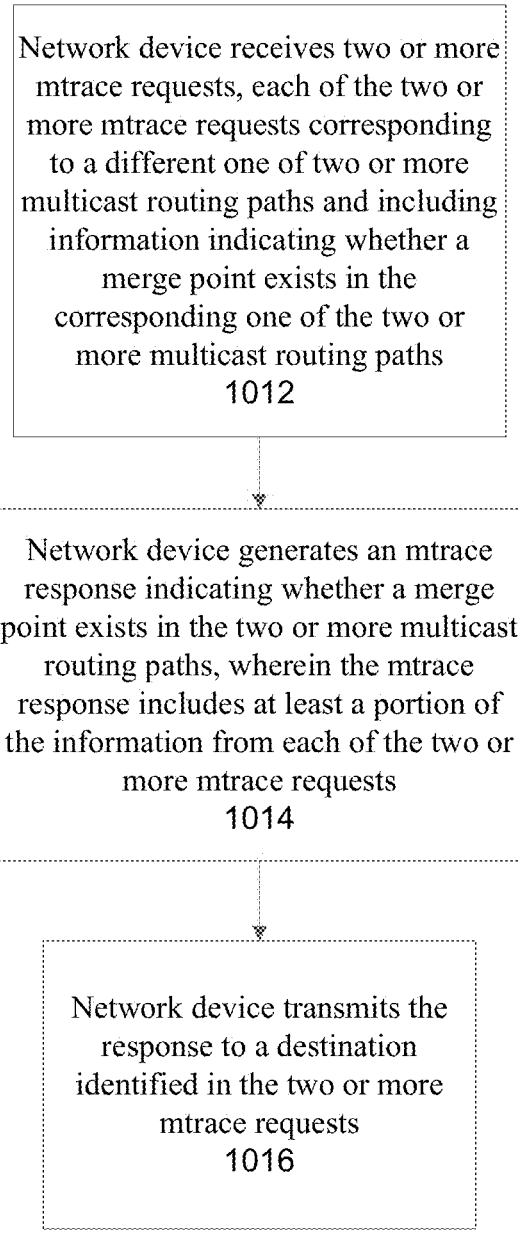
FIG. 10B is a process flow diagram illustrating another example method of generating a response message from two or more request messages by a FHR in accordance with various embodiments.

FIG. 10B is a process flow diagram illustrating another example method of generating a response message from two or more request messages by a network device such as a FHR in accordance with various embodiments. A network device such as a FHR may receive two or more mtrace requests at 1012, where each of the two or more mtrace requests corresponds to a different one of two or more multicast routing paths and includes information indicating whether a merge point exists in the corresponding one of the two or more multicast routing paths. The network device may generate an mtrace response indicating whether a merge point exists in the two or more multicast routing paths at 1014, wherein the mtrace response includes at least a portion of the information from each of the two or more mtrace requests. For example, the mtrace response may identify each merge point identifier (e.g., IP address) present in each of the two or more mtrace requests. For example, merge portion(s) from each of the two or more mtrace requests may be transmitted in the mtrace response. As described above with reference to FIG. 10A, a merge portion may be implemented by a Merge Point of Redundant Paths Response block (e.g., in a MoFRR network) or a Merge Point of Redundant Flows Response block (e.g., in a Live-Live network), which may follow or include a Standard Response Block identifying the Merge Point. The network device may then transmit the response to a destination identified in the two or more mtrace requests at 1016.

The disclosed embodiments may be applicable regardless of the version of mtrace that is implemented. In addition, it is important to note that the disclosed message formats are merely examples, and therefore the disclosed embodiments may be implemented with various mtrace message formats.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment, the disclosed techniques are implemented in software such as an operating system or in an application running on an operating system.

A software or software/hardware hybrid packet processing system of the disclosed embodiments may be implemented on a general-purpose programmable machine selectively activated or reconfigured by a computer program stored in memory. Such programmable machine may be a network device designed to handle network traffic. Such network devices typically have multiple network interfaces. Specific examples of such network devices include routers, switches, and access points. For example, the packet processing systems of the disclosed embodiments may be implemented via wireless controller models 4400 series and 2006 series, and access points models 1000 series and 12xx series available from Cisco Systems, Inc. of San Jose, Calif. The network devices may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. Further, the disclosed embodiments may be at least partially implemented on a card (e.g., an interface card) for a network device or a general-purpose computing device.

In one embodiment, the network device implementing the disclosed embodiments is a router. Referring now to FIG. 11, a router 1110 suitable for implementing the disclosed embodiments includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software. CPU 62 may include one or more processors 1163 such as a processor from the Motorola family of microprocessors or the MIPS family of microprocessors. In an alternative embodiment, processor 1163 is specially designed hardware for controlling the operations of router 10. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

The interfaces 1168 are typically provided as interface cards (sometimes referred to as "line cards"). Generally, they control the sending and receiving of data packets or data segments over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, Asynchronous Transfer Mode (ATM) interfaces, High-Speed Serial Interface (HSSI) interfaces, Packet over Synchronous Optical Network (POS) interfaces, Fiber Distributed Data Interface (FDDI) interfaces, Local Area Network (LAN) interfaces, Wireless Area Network (WAN) interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 11 is one specific router that may be used to implement the disclosed embodiments, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 1165) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. An apparatus, comprising:
a processor; and
a memory, at least one of the processor or the memory being adapted for:
receiving, by a network device at a merge point, an mtrace query that identifies two or more multicast routing paths from a source, wherein the two or more multicast routing paths converge at the merge point;
generating, by the network device, two or more mtrace requests using at least a portion of information obtained from the mtrace query such that each of the two or more mtrace requests identifies a different one of the two or more multicast routing paths;
forwarding, by the network device, each of the two or more mtrace requests via a different one of the two or more multicast routing paths towards a multicast router associated with the source; and receiving, by the network device, at least one response originating from the multicast router, the at least one response comprising information pertaining to the two or more multicast routing paths.

2. The apparatus as recited in claim 1, wherein the query further includes a time-to-live (TTL) value, and wherein each of the two or more mtrace requests includes the TTL value.

3. The apparatus as recited in claim 1, wherein each of the two or more mtrace requests identifies a different one of the two or more multicast routing paths in a header, and further identifies the alternate one of the two or more multicast routing paths.

4. The apparatus as recited in claim 1, wherein the query includes two or more query identifiers identifying the two or more multicast routing paths, each of the two or more query identifiers identifying a different one of the two or more multicast routing paths, and wherein a header of each of the two or more mtrace requests includes a different one of the two or more query identifiers.

5. The apparatus as recited in claim 1, wherein the query includes two or more source-group pairs, each of the two or more source-group pairs including a different pair of source and multicast group identifiers, each of the two or more source-group pairs identifying a different one of the two or more multicast routing paths, wherein each of the two or more mtrace requests pertains to a different one of the two or more source-group pairs, and wherein a header of each of the two or more mtrace requests includes a different one of the two or more source-group pairs.

6. The apparatus as recited in claim 1, wherein generating each of the two or more mtrace requests using at least a portion of information obtained from the mtrace query is performed such that each of the two or more mtrace requests comprises topology information pertaining to a topology of the corresponding one of the two or more multicast routing paths, and wherein the information in the response pertains to the topology of each of the two or more multicast routing paths.

7. The apparatus as recited in claim 1, wherein the information in the response identifies each merge point in the two or more multicast routing paths.

8. A method, comprising:
receiving by an intermediate device an mtrace request, the mtrace request comprising a source identifier, a group identifier, a destination identifier, and a query identifier;
providing an identifier of the intermediate device in a topology portion of the mtrace request such that topology information in the mtrace request is updated;
upon determining whether the intermediate device is a merge point of two or more multicast routing paths from the source identifier, updating the mtrace request with a merge point indicator; and
transmitting the mtrace request to the source identifier, wherein the mtrace request includes one or more topology portions that include identifiers of one or more devices including the intermediate device.

9. The method as recited in claim 8, wherein each of the topology portions includes a Standard Response Block, wherein each of the identifiers is provided in a different Standard Response Block.

10. The method as recited in claim 8, wherein each of the topology portions includes a Standard Response Block and a Topology Identifier augmented response block.

11. The method as recited in claim 8, further comprising:
providing a Topology Identifier (ID) associated with the intermediate device in the topology portion of the mtrace request.

12. The method as recited in claim 11, wherein the Topology ID associated with each of the identifiers is provided in a different Topology ID augmented response block.

13. An apparatus, comprising:
a processor; and
a memory, at least one of the processor or the memory being adapted for:
receiving, by a network device, two or more mtrace requests originating from a merge point where two or more multicast routing paths from the network device converge, each of the two or more mtrace requests corresponding to a different one of the two or more multicast routing paths and including topology information identifying one or more other network devices in the corresponding one of the two or more multicast routing paths;
generating by the network device an mtrace response including the topology information from each of the two or more mtrace requests; and
transmitting by the network device the mtrace response to a destination identifier identified in the two or more mtrace requests.

14. The apparatus as recited in claim 13, wherein each of the two or more mtrace requests includes a Topology ID corresponding to each of the one or more other network devices in the corresponding one of the two or more multicast routing paths.

15. The apparatus as recited in claim 13, wherein the mtrace response includes a first topology portion corresponding to a first one of the two or more mtrace requests and a second topology portion corresponding to a second one of the two or more mtrace requests, wherein the first topology portion includes a network identifier of one or more network devices in a first one of the two or more multicast routing paths, and wherein the second topology portion includes a network identifier of one or more network devices in a second one of the two or more multicast routing paths.

16. The apparatus as recited in claim 15, wherein the first topology portion further includes a Topology ID corresponding to each of the one or more other network devices in the first one of the two or more multicast routing paths, and wherein the second topology portion further includes a Topology ID corresponding to each of the one or more other network devices in the second one of the two or more multicast routing paths.

17. The apparatus as recited in claim 13, wherein each of the two or more mtrace requests includes a different one of two or more query identifiers that each correspond to a different one of the two or more multicast routing paths.

18. The apparatus as recited in claim 13, wherein each of the two or more mtrace requests pertains to a different one of two or more source-group pairs, each of the two or more source-group pairs including a different pair of source and group identifiers, each of the two or more source-group pairs identifying a different one of the two or more multicast routing paths.

19. A method, comprising:
receiving, by an intermediate device, a first mtrace request transmitted via a first one of two or more multicast routing paths;
receiving, by the intermediate device, a second mtrace request transmitted via a second one of the two or more multicast routing paths;
determining from the first mtrace request and the second mtrace request whether the intermediate device is a merge point of the first one of the two or more multicast routing paths and the second one of the two or more multicast routing paths; and transmitting information indicating whether the intermediate device is the merge point according to a result of the determining step.

20. The method as recited in claim 19, wherein transmitting the information comprises transmitting the information in the second mtrace request.

21. The method as recited in claim 19, wherein transmitting the information comprises:

transmitting the second mtrace request, wherein an absence of a merge point identifier or merge point indicator in the second mtrace request indicates that the intermediate device is not a merge point.

22. The method as recited in claim 19, wherein the first mtrace request includes a time-to-live (TTL) value, the method further comprising:

storing by the intermediate device information including at least a portion of the first mtrace request such that the portion of the first mtrace request is stored with the TTL value;

receiving by the intermediate device a second mtrace request;

determining from the stored information that the first mtrace request and the second mtrace request each identify a different one of the two or more paths;

providing information in the second mtrace request identifying the intermediate device as a merge point of the one of the two or more paths corresponding to the first mtrace request and the second mtrace request; and sending the second mtrace request identifying the intermediate device as the merge point of the path corresponding to the first mtrace request and the second mtrace request.

23. The method as recited in claim 19, further comprising:

providing merge information in the second mtrace request, the merge information identifying the intermediate device as a merge point of a first path corresponding to the first mtrace request and a second path corresponding to the second mtrace request; and sending the second mtrace request including the merge information identifying the intermediate device as the merge point of the first path corresponding to the first mtrace request and the second path corresponding to the second mtrace request.

24. An apparatus, comprising:

means for receiving, by a network device, two or more mtrace requests originating from a merge point where two or more multicast routing paths from the network device converge, each of the two or more mtrace requests corresponding to a different one of the two or more multicast routing paths and including information pertaining to the corresponding one of the two or more multicast routing paths;

means for generating by the network device an mtrace response including information pertaining to each of the two or more multicast routing paths, wherein the mtrace response includes at least a portion of the information from each of the two or more mtrace requests; and means for transmitting by the network device the response to a destination identified in the two or more mtrace requests.

25. The apparatus as recited in claim 24, wherein each of the two or more mtrace requests includes information indicating whether any merge points exist in the corresponding one of the two or more multicast routing paths, and wherein the mtrace response indicates the any merge points.

26. The apparatus as recited in claim 25, wherein the response identifies each merge point identifier in the two or more mtrace requests.

* * * * *